(12) United States Patent
Zhang et al.

(10) Patent No.: US 12,202,671 B1
(45) Date of Patent: Jan. 21, 2025

(54) MOBILE STORAGE GOODS SHELF

(71) Applicant: Grow Pros Solutions, Chino, CA (US)

(72) Inventors: Duo Zhang, Chino, CA (US); Zhihui Long, Chino, CA (US)

(73) Assignee: Grow Pros Solutions, Chino, CA (US)

( * ) Notice: Subject to any disclaimer, the term of this patent is extended or adjusted under 35 U.S.C. 154(b) by 0 days.

(21) Appl. No.: 18/511,822

(22) Filed: Nov. 16, 2023

(51) Int. Cl.
*B65G 1/02* (2006.01)
*A47B 47/00* (2006.01)
*A47B 87/00* (2006.01)

(52) U.S. Cl.
CPC .......... *B65G 1/026* (2013.01); *A47B 47/0091* (2013.01); *A47B 87/001* (2013.01); *A47B 87/007* (2013.01)

(58) Field of Classification Search
CPC .......... B65G 1/026; B65G 1/065; B65G 1/06; B65G 1/0492; A47B 47/0091; A47B 87/00; A47B 87/001; A47B 87/02; A47B 87/007; A47B 87/0207; A47B 87/0215; A47B 87/0223; A47B 2087/023; A47B 2087/0238; A47B 87/0276
See application file for complete search history.

(56) References Cited

U.S. PATENT DOCUMENTS

| | | | | |
|---|---|---|---|---|
| 4,955,489 A | * | 9/1990 | Allen | B65G 1/026 |
| | | | | 211/151 |
| 5,141,118 A | * | 8/1992 | Gay | B65G 1/026 |
| | | | | 211/151 |
| 5,316,157 A | * | 5/1994 | Konstant | A47B 53/00 |
| | | | | 211/151 |
| 5,419,444 A | * | 5/1995 | Strom | B65G 1/026 |
| | | | | 211/151 |
| 8,739,985 B2 | * | 6/2014 | Krummell | B65G 1/026 |
| | | | | 211/151 |
| 2017/0267450 A1 | * | 9/2017 | Johncox | B65G 1/02 |
| 2018/0125231 A1 | * | 5/2018 | Reyes | A47B 47/027 |
| 2018/0170672 A1 | * | 6/2018 | Salichs | B65G 1/065 |
| 2018/0201442 A1 | * | 7/2018 | Battles | B65G 1/02 |
| 2019/0092567 A1 | * | 3/2019 | Lawrence | B65G 1/026 |
| 2020/0148474 A1 | * | 5/2020 | Salichs | B65G 1/06 |
| 2020/0163470 A1 | * | 5/2020 | Chen | A47F 5/0093 |
| 2020/0283227 A1 | * | 9/2020 | Iellimo | B65G 1/026 |
| 2021/0169219 A1 | * | 6/2021 | Lert, Jr. | A47B 87/008 |
| 2021/0198039 A1 | * | 7/2021 | Salichs | B65G 1/026 |
| 2021/0347587 A1 | * | 11/2021 | Levi | B65G 67/20 |
| 2024/0208725 A1 | * | 6/2024 | Nemethy | A47B 57/10 |
| 2024/0253855 A1 | * | 8/2024 | Park | B65G 1/026 |

* cited by examiner

Primary Examiner — Devin K Barnett (57) ABSTRACT

A mobile storage goods shelf includes a support device, a rolling device arranged on the support device, a storage countertop arranged on the rolling device, a protective device arranged on the storage countertop and including a first protecting module, a second protecting module with one end being connected to the first protecting module and the other end being connected to a third protecting module thereof. The support device includes a first supporting module, a second supporting module with one end being connected to the first supporting module and the other end being connected to a third supporting module thereof. All the support device, the rolling device, the storage countertop and the protective device extend or add modules along a horizontal direction of the first supporting module to increase or decrease a length of the storage goods shelf according to actual needs, so as to easily use the storage goods shelf.

9 Claims, 7 Drawing Sheets

MOBILE STORAGE GOODS SHELF

BACKGROUND

Technical Field

The present disclosure generally relates to the field of logistics and warehousing technologies, and especially relates to a mobile storage goods shelf.

Description of Related Art

Logistics, as a part of supply chain activities, is centered around warehousing to promote synchronization between productions and markets. Logistics is the entire process of planning, implementing and managing raw materials, semi-finished products, finished products and related information from places of origin of goods to places of consumption of goods through transportation, storage and distribution at the lowest cost to meet needs of customers.

During performing goods storage in a process of logistics, storage racks are required for performing goods storage. The storage racks are storage devices based on packaging, transportation, loading and unloading, sorting and information management that are six basic functions of logistics. Therefore, a goods shelf, as a main storage structure, is an essential component of modern industrial warehouses, logistics centers and distribution centers. A storage goods shelf usually includes three main components: columns, beams and laminates. However, a conventional storage goods shelf has the following problems: nowadays, shelves are usually fixed at a certain location for being used, and when the goods shelf is necessary to be moved, it needs to firstly put down items from the goods shelf before moving the goods shelf, which will waste a lot of time.

SUMMARY

The technical problems to be solved: in view of the shortcomings of the related art, the present disclosure provides a mobile storage goods shelf to overcome shortcomings that are described in the related art.

In order to implement the above technical purpose, a technical solution provided by the present disclosure is:

a mobile storage goods shelf according to an embodiment of the present disclosure includes: a support device, a rolling device arranged on the support device, a storage countertop arranged on the rolling device, and a protective device arranged on the storage countertop;

the support device including a first supporting module, a second supporting module and a third supporting module, one end of the second supporting module connected to the first supporting module, and the other end of the second supporting module connected to the third supporting module;

the protective device including a first protecting module, a second protecting module and a third protecting module, one end of the second protecting module connected to the first protecting module, and the other end of the second protecting module connected to the third protecting module; and wherein all of the support device, the rolling device, the storage countertop and the protective device can extend or add modules along a horizontal direction of the first supporting module.

Wherein the support device includes a first connecting member, a second connecting member, a third connecting member, a fourth connecting member, a fifth connecting member, a sixth connecting member, a seventh connecting member and an eighth connecting member; each of the first connecting member, the second connecting member, the third connecting member, the fourth connecting member, the fifth connecting member, the sixth connecting member, the seventh connecting member and the eighth connecting member including a first limiting hole, a second limiting hole, a third limiting hole, a fourth limiting hole and a fifth limiting hole with the same positions thereof.

Wherein the first supporting module includes a first supporting rod, a second supporting rod, a third supporting rod, a fourth supporting rod, a first bar, a second bar, a first cross bar, a second cross bar, a third cross bar and a fourth cross bar; an upper end of the first supporting rod received in the fourth limiting hole of the first connecting member, an upper end of the second supporting rod received in the fourth limiting hole of the second connecting member, an upper end of the third supporting rod received in the fourth limiting hole of the third connecting member, and an upper end of the fourth supporting rod received in the fourth limiting hole of the fourth connecting member; one end of the first bar received in the second limiting hole of the first connecting member, and the other end of the first bar received in the third limiting hole of the third connecting member; one end of the second bar received in the third limiting hole of the second connecting member, and the other end of the second bar received in the second limiting hole of the fourth connecting member; one end of the first cross bar received in the first limiting hole of the first connecting member and connected to the first limiting hole of the first connecting member, and the other end of the first cross bar received in the first limiting hole of the second connecting member and connected to the first limiting hole of the second connecting member; one end of the third cross bar received in the first limiting hole of the third connecting member and connected to the first limiting hole of the third connecting member, and the other end of the third cross bar received in the first limiting hole of the fourth connecting member and connected to the first limiting hole of the fourth connecting member; one end of the second cross bar connected to the first supporting rod, and the other end of the second cross bar connected to the second supporting rod; one end of the fourth cross bar connected to the third supporting rod, and the other end of the fourth cross bar connected to the fourth supporting rod.

Wherein the second supporting module includes a fifth supporting rod, a sixth supporting rod, a third bar, a fourth bar, a fifth cross bar and a sixth cross bar; an upper end of the fifth supporting rod received in the fourth limiting hole of the fifth connecting member, and an upper end of the sixth supporting rod received in the fourth limiting hole of the sixth connecting member; one end of the third bar received the second limiting hole of the third connecting member, and the other end of the third bar received the third limiting hole of the fifth connecting member; one end of the fourth bar received the third limiting hole of the fourth connecting member, and the other end of the fourth bar received the second limiting hole of the sixth connecting member; one end of the fifth cross bar received in the first limiting hole of the fifth connecting member and connected to the first limiting hole of the fifth connecting member, and the other end of the fifth cross bar received in the first limiting hole of the sixth connecting member and connected to the first limiting hole of the sixth connecting member; one end of the sixth cross bar connected to the fifth supporting rod, and the other end of the sixth cross bar connected to the sixth supporting rod.

Wherein the third supporting module includes a seventh supporting rod, an eighth supporting rod, a fifth bar, a sixth bar, a seventh cross bar and an eighth cross bar; an upper end of the seventh supporting rod received in the fourth limiting hole of the seventh connecting member, and an upper end of the eighth supporting rod received in the fourth limiting hole of the eighth connecting member; one end of the fifth bar received in the second limiting hole of the fifth connecting member, and the other end of the fifth bar received in the third limiting hole of the seventh connecting member; one end of the sixth bar received in the third limiting hole of the sixth connecting member, and the other end of the sixth bar received in the second limiting hole of the eighth connecting member; one end of the seventh cross bar received in the first limiting hole of the seventh connecting member and connected to the first limiting hole of the seventh connecting member, and the other end of the seventh cross bar received in the first limiting hole of the eighth connecting member and connected to the first limiting hole of the eighth connecting member; one end of the eighth cross bar connected to the seventh supporting rod, and the other end of the eighth cross bar connected to the eighth supporting rod.

Wherein the storage countertop includes a first strip module, a second strip module, a first transverse plate, a second transverse plate, and a plurality of ninth cross bars, a first connecting portion, a second connecting portion, a third connecting portion, a fourth connecting portion, a fifth connecting portion, a sixth connecting portion, a seventh connecting portion and an eighth connecting portion; the plurality of ninth cross bars arranged in sequence between the first strip module and the second strip module, and respectively connected to the first strip module and the second strip module; the first strip module including a first strip baffle, a third strip baffle, and a fifth strip baffle; the second strip module including a second strip baffle, a fourth strip baffle, and a sixth strip baffle; the first transverse plate connected to both the first connecting portion and the second connecting portion, and the second transverse plate connected to both the seventh connecting portion and the eighth connecting portion; the first strip baffle connected to both the first connecting portion and the third connecting portion, and the second strip baffle connected to both the second connecting portion and the fourth connecting portion; the third strip baffle connected to both the third connecting portion and the fifth connecting portion, and the fourth strip baffle connected to both the fourth connecting portion and the sixth connecting portion; the fifth strip baffle connected to both the fifth connecting portion and the seventh connecting portion, and the sixth strip baffle connected to both the sixth connecting portion and the eighth connecting portion.

Wherein the rolling device includes a first shaft lever, a second shaft lever, a first limiting plate, a second limiting plate, a third limiting plate and a fourth limiting plate; the first shaft lever and the second shaft lever are each composed of a plurality of shaft levers and are detachable from each other; a handwheel arranged on one end of the first shaft lever; positions of all the first limiting plate, the second limiting plate, the third limiting plate and the fourth limiting plate corresponding to each other, and the first shaft lever and the second shaft lever respectively arranged on both sides of each of the first limiting plate, the second limiting plate, the third limiting plate and the fourth limiting plate; one end of the first limiting plate buckled onto the first cross bar, and the other end of the first limiting plate buckled onto the ninth cross bar; one end of the second limiting plate buckled onto the third cross bar, and the other end of the second limiting plate buckled onto the ninth cross bar; one end of the third limiting plate buckled onto the fifth cross bar, and the other end of the third limiting plate buckled onto the ninth cross bar; one end of the fourth limiting plate buckled onto the seventh cross bar, and the other end of the fourth limiting plate buckled onto the ninth cross bar.

Wherein the protective device includes a first connecting unit, a second connecting unit, a third connecting unit, a fourth connecting unit, a fifth connecting unit, a sixth connecting unit, a seventh connecting unit and an eighth connecting unit; each of the first connecting unit, the second connecting unit, the third connecting unit, the fourth connecting unit, the fifth connecting unit, the sixth connecting unit, the seventh connecting unit and the eighth connecting unit including a first through hole, a second through hole, a third through hole and a sixth limiting hole correspondingly; the first protecting module including a first long tube, a second long tube, a third long tube, a fourth long tube, a first square tube, a second square tube, a first rectangular tube and a second rectangular tube; one end of the first rectangular tube arranged inside the sixth limiting hole of the first connecting unit, and the other end of the first rectangular tube arranged inside the sixth limiting hole of the second connecting unit; one end of the second rectangular tube arranged inside the sixth limiting hole of the third connecting unit, and the other end of the second rectangular tube arranged inside the sixth limiting hole of the fourth connecting unit; one end of the first long tube arranged inside the second through hole of the first connecting unit, and the other end of the first long tube passing through the second through hole of the first connecting unit and arranged inside the first connecting portion; one end of the second long tube arranged inside the second through hole of the second connecting unit, and the other end of the second long tube passing through the second through hole of the second connecting unit and arranged inside the second connecting portion; one end of the third long tube arranged inside the second through hole of the third connecting unit, and the other end of the third long tube passing through the second through hole of the third connecting unit and arranged inside the third connecting portion; one end of the fourth long tube arranged inside the second through hole of the fourth connecting unit, and the other end of the fourth long tube passing through the second through hole of the fourth connecting unit and arranged inside the fourth connecting portion; one end of the first square tube arranged in the first through hole of the first connecting unit, and the other end of the first square tube arranged in the first through hole of the third connecting unit; one end of the second square tube arranged in the first through hole of the second connecting unit, and the other end of the second square tube arranged in the first through hole of the fourth connecting unit.

Wherein the second protecting module includes a fifth long tube, a sixth long tube, a third square tube, a fourth square tube and a third rectangular tube; one end of the fifth long tube arranged inside the second through hole of the fifth connecting unit, and the other end of the fifth long tube passing through the second through hole of the fifth connecting unit and arranged inside the fifth connecting portion; one end of the sixth long tube arranged inside the second through hole of the sixth connecting unit, and the other end of the sixth long tube passing through the second through hole of the sixth connecting unit and arranged inside the sixth connecting portion; one end of the third square tube arranged inside the first through hole of the third connecting unit, and the other end of the third square tube arranged inside the first through hole of the fifth connecting unit; one end of the fourth square tube arranged inside the first through hole of the fourth connecting unit, and the other end of the fourth square tube arranged inside the first through hole of the sixth connecting unit; one end of the third rectangular tube arranged inside the sixth limiting hole of the fifth connecting unit, and the other end of the third rectangular tube arranged inside the sixth limiting hole of the sixth connecting unit.

Wherein the third protecting module includes a seventh long tube, an eighth long tube, a fifth square tube, a sixth square tube and a fourth rectangular tube; one end of the seventh long tube arranged inside the second through hole of the seventh connecting unit, and the other end of the seventh long tube passing through the second through hole of the seventh connecting unit and arranged inside the seventh connecting portion; one end of the eighth long tube arranged inside the second through hole of the eighth connecting unit, and the other end of the eighth long tube passing through the second through hole of the eighth connecting unit and arranged inside the eighth connecting portion; one end of the fifth square tube arranged inside the first through hole of the fifth connecting unit, and the other end of the fifth square tube arranged inside the first through hole of the seventh connecting unit; one end of the sixth square tube arranged inside the first through hole of the sixth connecting unit, and the other end of the sixth square tube arranged inside the first through hole of the eighth connecting unit; one end of the fourth rectangular tube arranged inside the sixth limiting hole of the seventh connecting unit, and the other end of the fourth rectangular tube arranged inside the sixth limiting hole of the eighth connecting unit.

Comparing with the related art, the present disclosure provides the advantages as below:

the present disclosure can increase or decrease a length of the storage goods shelf according to actual usage requirements, so as to easily use the storage goods shelf. The first shaft lever is driven to move by rotating the handwheel, so that the storage countertop is driven to follow moving, thereby the protective device is also driven to move. A movement distance of each of the first shaft lever and the second shaft lever is limited by all of the first limiting plate, the second limiting plate, the third limiting plate and the fourth limiting plate. In this way, both the first shaft lever and the second shaft lever can only perform reciprocating motion thereof.

DETAILED DESCRIPTION

References will now be made in detail to embodiments, examples of which are illustrated in the accompanying drawings. In the following detailed description, numerous specific details are set forth in order to provide a thorough understanding of the subject matter presented herein. Obviously, the implementation embodiment in the description is a part of the present disclosure implementation examples, rather than the implementation of all embodiments, examples. According to the described embodiment of the present disclosure, all other embodiments obtained by one of ordinary skill in the related art without the need for a creative labor are within the protection scope of the present disclosure.

In the description of the present disclosure, it needs to be understood that the terms mentioned below: "central", "upper", "below", "left", "right", "vertical", "horizontal", "inner", "outer" etc, are shown in the specification of the present disclosure. The indicated orientation or position of the terms shown in the detailed description is based on the orientation or position shown in the figures of the accompanying drawings of the present disclosure, which is only to easily simplify the description of the present disclosure, but not indicated that the devices or elements of the present disclosure should have a particular orientation or should be designed and operated in a particular orientation. So the terms used to describe positional relationships in the attached drawings are only for illustrative purposes, and illustrated in the detail description are not by way of the limitation of the present disclosure. Furthermore, the terms such as "first", "second" and "third" shown in the specification are only used to describe, but not indicated that the elements of the present disclosure is important or represented the amount of the elements. In addition, in the present disclosure, except where specifically otherwise illustrated or limited, the terms "install", "connect" and "link" used herein should be understood in a broad sense. Such as, the meaning may be tight connection, removable connection, or integrated connection. The meaning may also be mechanical connection, electrical connection, direct connection or indirect connection through intermediaries, or internal connection within two elements. The meaning of the terms used herein may be understood by one of ordinary skill in the related art according to specific conditions of the present disclosure.

Referring to FIG. 1 to FIG. 8, a mobile storage goods shelf in accordance with an embodiment of the present disclosure includes a support device 1, a rolling device 2 arranged on the support device 1, a storage countertop 3 arranged on the rolling device 2, and a protective device 4 arranged on the storage countertop 3. The support device 1 includes a first supporting module 11, a second supporting module 12 and a third supporting module 13, one end of the second supporting module 12 connected to the first supporting module 11, and the other end of the second supporting module 12 connected to the third supporting module 13. The protective device 4 includes a first protecting module 41, a second protecting module 42 and a third protecting module 43, one end of the second protecting module 42 connected to the first protecting module 41, and the other end of the second protecting module 42 connected to the third protecting module 43. All of the support device 1, the rolling device 2, the storage countertop 3 and the protective device 4 can extend or add modules along a horizontal direction of the first supporting module 11 to increase or decrease a length of the storage goods shelf according to actual usage requirements. 33.

Figure 1:
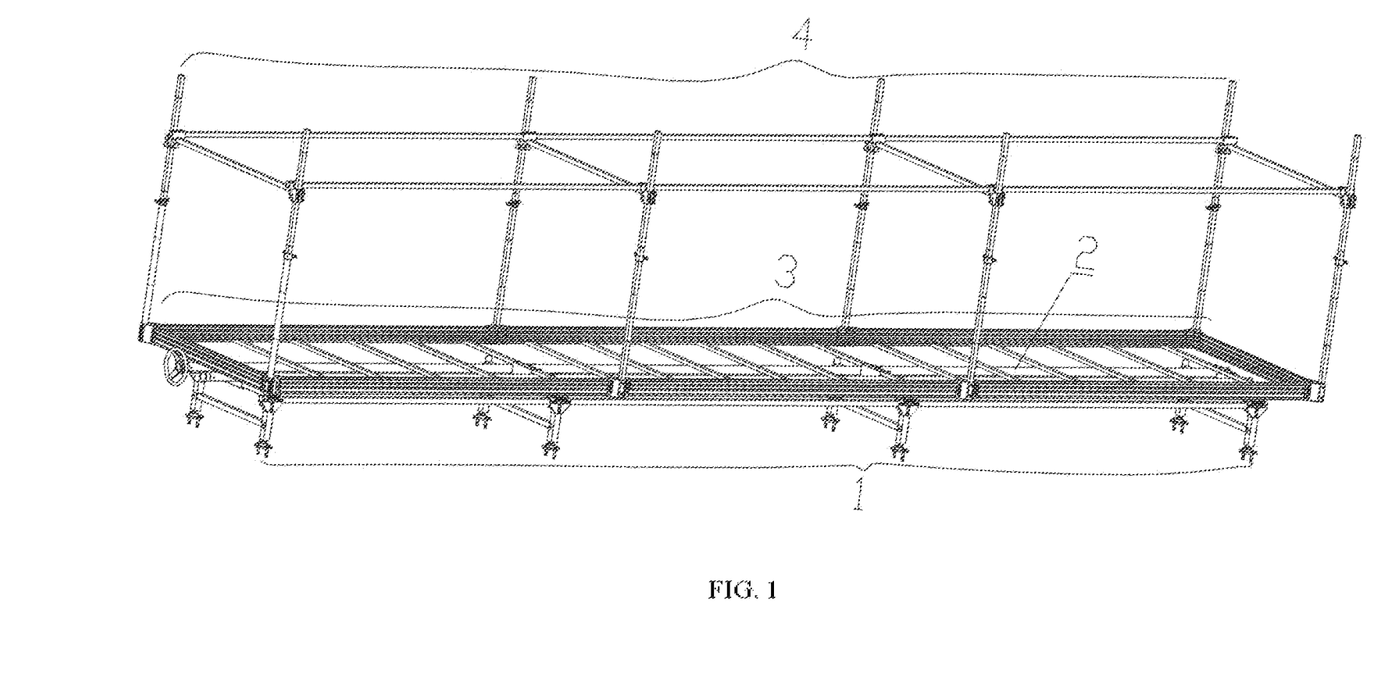
FIG. 1 is a schematic view of a mobile storage goods shelf in accordance with an embodiment of the present disclosure.
Figure 2:
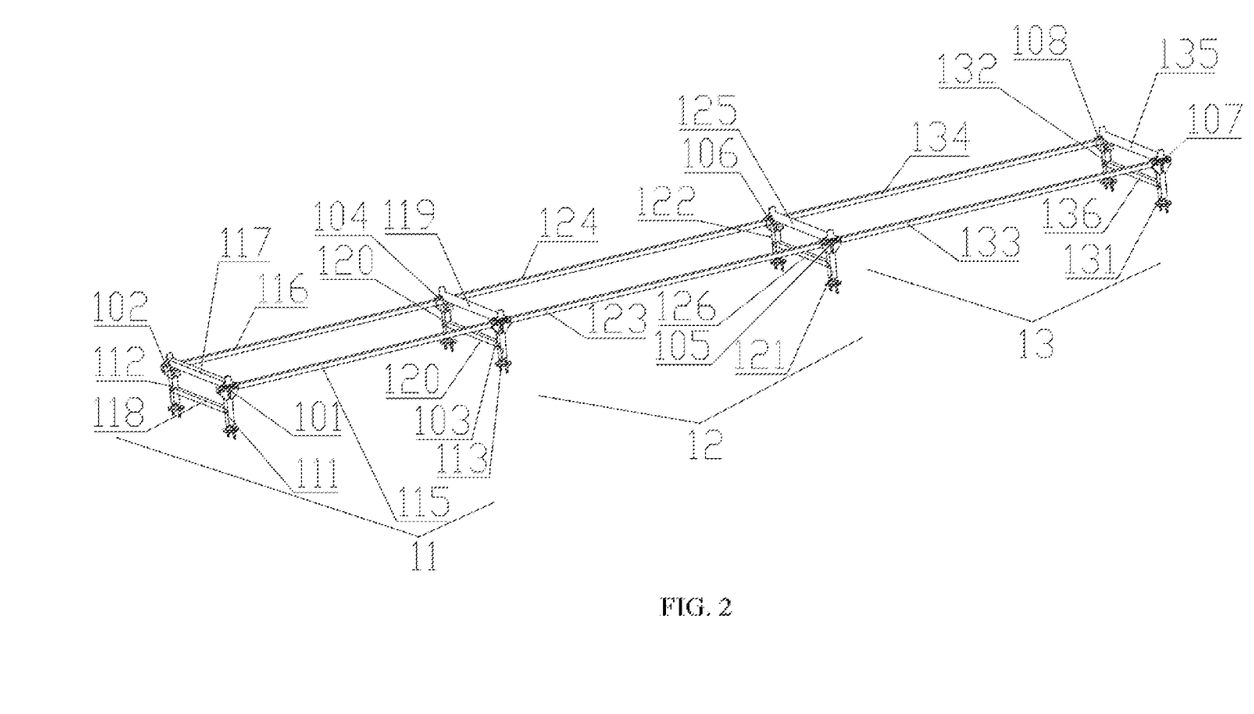
FIG. 2 is a schematic view of a support device of the mobile storage goods shelf of FIG. 1.
Figure 6:
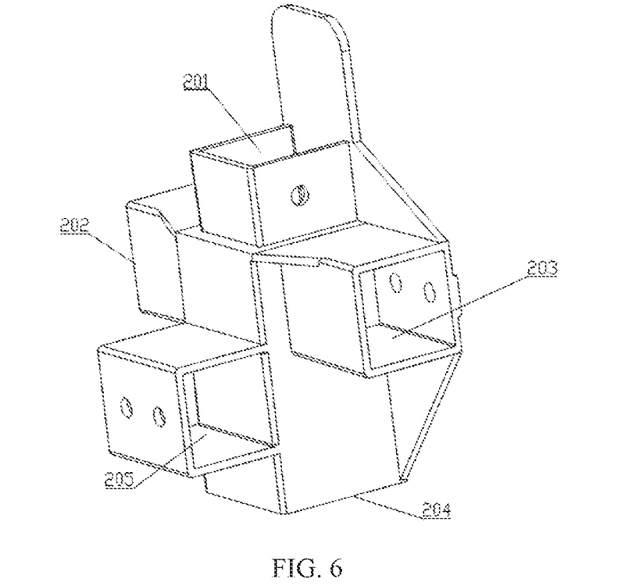
FIG. 6 is a schematic view of a connecting member of the mobile storage goods shelf of FIG. 1.
Figure 7:
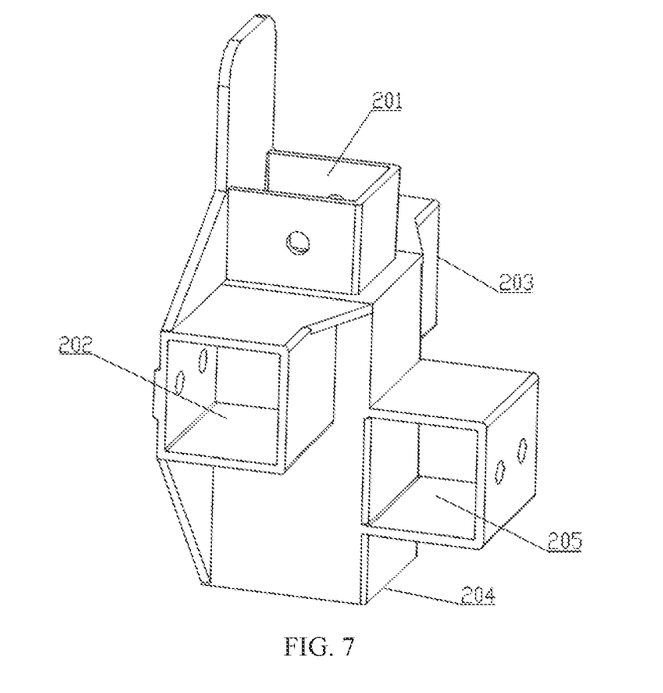
FIG. 7 is similar to FIG. 6, but shown from another aspect. 29.

The support device 1 includes a first connecting member 101, a second connecting member 102, a third connecting member 103, a fourth connecting member 104, a fifth connecting member 105, a sixth connecting member 106, a seventh connecting member 107 and an eighth connecting member 108; each of the first connecting member 101, the second connecting member 102, the third connecting member 103, the fourth connecting member 104, the fifth connecting member 105, the sixth connecting member 106, the seventh connecting member 107 and the eighth connecting member 108 including a first limiting hole 201, a second limiting hole 202, a third limiting hole 203, a fourth limiting hole 204 and a fifth limiting hole 205 with the same positions thereof.

The first supporting module 11 includes a first supporting rod 111, a second supporting rod 112, a third supporting rod 113, a fourth supporting rod 114, a first bar 115, a second bar 116, a first cross bar 117, a second cross bar 118, a third cross bar 119 and a fourth cross bar 120. An upper end of the first supporting rod 111 is received in the fourth limiting hole 204 of the first connecting member 101, an upper end of the second supporting rod 112 received in the fourth limiting hole 204 of the second connecting member 102, an upper end of the third supporting rod 113 received in the fourth limiting hole 204 of the third connecting member 103, and an upper end of the fourth supporting rod 114 received in the fourth limiting hole 204 of the fourth connecting member 104; one end of the first bar 115 received in the second limiting hole 202 of the first connecting member 101, and the other end of the first bar 115 received in the third limiting hole 203 of the third connecting member 103; one end of the second bar 116 received in the third limiting hole 103 of the second connecting member 102, and the other end of the second bar 116 received in the second limiting hole 202 of the fourth connecting member 104; one end of the first cross bar 117 received in the first limiting hole 201 of the first connecting member 101 and connected to the first limiting hole 201 of the first connecting member 101, and the other end of the first cross bar 117 received in the first limiting hole 201 of the second connecting member 102 and connected to the first limiting hole 201 of the second connecting member 102; one end of the third cross bar 119 received in the first limiting hole 201 of the third connecting member 103 and connected to the first limiting hole 201 of the third connecting member 103, and the other end of the third cross bar 119 received in the first limiting hole 201 of the fourth connecting member 104 and connected to the first limiting hole 201 of the fourth connecting member 104; one end of the second cross bar 118 connected to the first supporting rod 111, and the other end of the second cross bar 118 connected to the second supporting rod 112; one end of the fourth cross bar 120 connected to the third supporting rod 113, and the other end of the fourth cross bar 120 connected to the fourth supporting rod 114. In this way, the rolling device 2 is supported by contacting the ground with all of the first supporting rod 111, the second supporting rod 112, the third supporting rod 113, the fourth supporting rod 114, the fifth supporting rod 121, the sixth supporting rod 122, the seventh supporting rod 131 and the eighth supporting rod 132.

The second supporting module 12 includes a fifth supporting rod 121, a sixth supporting rod 122, a third bar 123, a fourth bar 124, a fifth cross bar 125 and a sixth cross bar 126; an upper end of the fifth supporting rod 121 received in the fourth limiting hole 204 of the fifth connecting member 105, and an upper end of the sixth supporting rod 122 received in the fourth limiting hole 204 of the sixth connecting member 106; one end of the third bar 123 received the second limiting hole 202 of the third connecting member 103, and the other end of the third bar 123 received the third limiting hole 203 of the fifth connecting member 105; one end of the fourth bar 124 received the third limiting hole 203 of the fourth connecting member 104, and the other end of the fourth bar 124 received the second limiting hole 202 of the sixth connecting member 106; one end of the fifth cross bar 125 received in the first limiting hole 201 of the fifth connecting member 105 and connected to the first limiting hole 201 of the fifth connecting member 105, and the other end of the fifth cross bar 125 received in the first limiting hole 201 of the sixth connecting member 106 and connected to the first limiting hole 201 of the sixth connecting member 106; one end of the sixth cross bar 126 connected to the fifth supporting rod 121, and the other end of the sixth cross bar 126 connected to the sixth supporting rod 122.

The third supporting module 13 includes a seventh supporting rod 131, an eighth supporting rod 132, a fifth bar 133, a sixth bar 134, a seventh cross bar 135 and an eighth cross bar 136; an upper end of the seventh supporting rod 131 received in the fourth limiting hole 204 of the seventh connecting member 107, and an upper end of the eighth supporting rod 132 received in the fourth limiting hole 204 of the eighth connecting member 108; one end of the fifth bar 133 received in the second limiting hole 202 of the fifth connecting member 105, and the other end of the fifth bar 133 received in the third limiting hole 203 of the seventh connecting member 107; one end of the sixth bar 134 received in the third limiting hole 203 of the sixth connecting member 106, and the other end of the sixth bar 134 received in the second limiting hole 202 of the eighth connecting member 108; one end of the seventh cross bar 135 received in the first limiting hole 201 of the seventh connecting member 107 and connected to the first limiting hole 201 of the seventh connecting member 107, and the other end of the seventh cross bar 135 received in the first limiting hole 201 of the eighth connecting member 108 and connected to the first limiting hole 201 of the eighth connecting member 108; one end of the eighth cross bar 136 connected to the seventh supporting rod 131, and the other end of the eighth cross bar 136 connected to the eighth supporting rod 132.

All of the first supporting rod 111, the second supporting rod 112, the third supporting rod 113, the fourth supporting rod 114, the fifth supporting rod 121, the sixth supporting rod 122, the seventh supporting rod 131 and the eighth supporting rod 132 contact the ground to support the rolling device 2, and a height of each of the first supporting rod 111, the second supporting rod 112, the third supporting rod 113, the fourth supporting rod 114, the fifth supporting rod 121, the sixth supporting rod 122, the seventh supporting rod 131 and the eighth supporting rod 132 can be selected according to actual needs of users. A width of each of the first cross bar 117, the second cross bar 118, the third cross bar 119, the fourth cross bar 120, the fifth cross bar 125, the sixth cross bar 126, the seventh cross bar 135 and the eighth cross bar 136 can also be selected according to actual needs of users. A height of each of the first bar 115, the second bar 116, the third bar 123, the fourth bar 124, the fifth bar 133 and the sixth bar 134 can also be selected according to actual needs of users.

Figure 3:
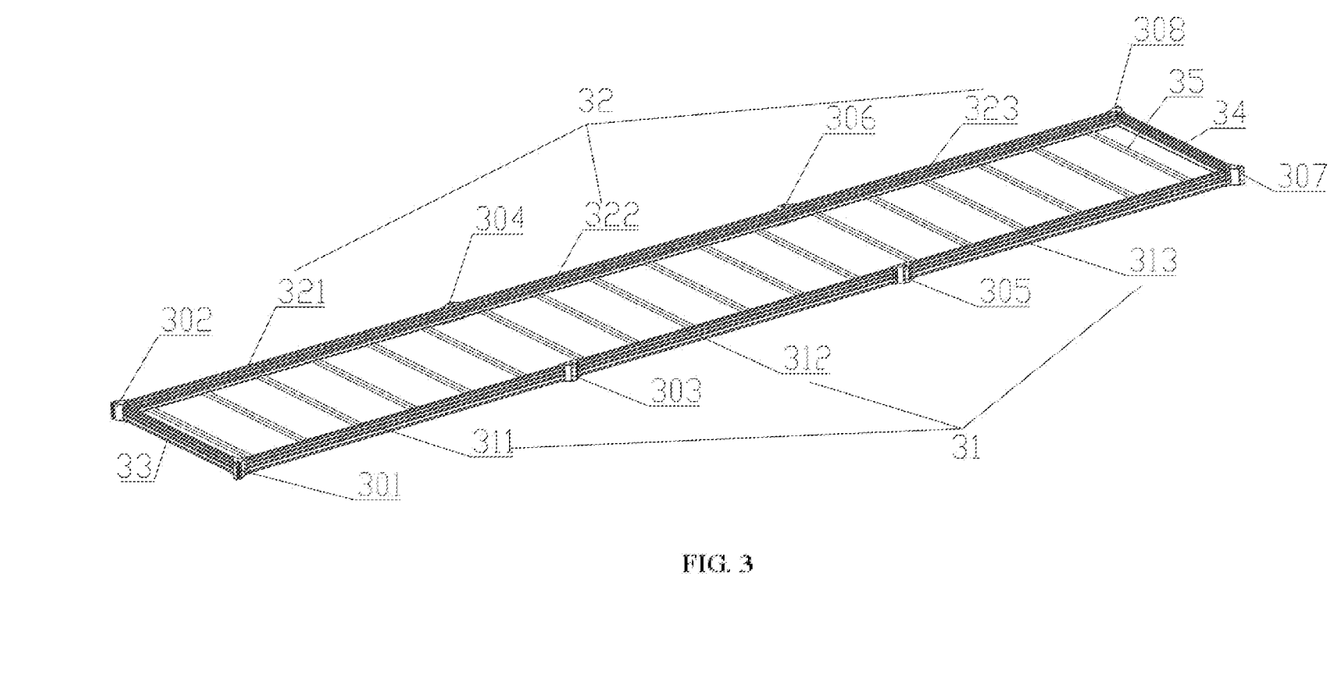
FIG. 3 is a schematic view of a storage countertop of the mobile storage goods shelf of FIG. 1.

The storage countertop 3 includes a first strip module 31, a second strip module 32, a first transverse plate 33, a second transverse plate 34, and a plurality of ninth cross bars 35, a first connecting portion 301, a second connecting portion 302, a third connecting portion 303, a fourth connecting portion 304, a fifth connecting portion 305, a sixth connecting portion 306, a seventh connecting portion 307 and an eighth connecting portion 308; the plurality of ninth cross bars 35 arranged in sequence between the first strip module 31 and the second strip module 32, and respectively connected to the first strip module 31 and the second strip module 32; the first strip module 31 including a first strip baffle 311, a third strip baffle 312, and a fifth strip baffle 313; the second strip module 32 including a second strip baffle 321, a fourth strip baffle 322, and a sixth strip baffle 323; the first transverse plate 33 connected to both the first connecting portion 301 and the second connecting portion 302, and the second transverse plate 34 connected to both the seventh connecting portion 307 and the eighth connecting portion 308; the first strip baffle 311 connected to both the first connecting portion 301 and the third connecting portion 303, and the second strip baffle 321 connected to both the second connecting portion 302 and the fourth connecting portion 304; the third strip baffle 312 connected to both the third connecting portion 303 and the fifth connecting portion 305, and the fourth strip baffle 322 connected to both the fourth connecting portion 304 and the sixth connecting portion 306; the fifth strip baffle 313 connected to both the fifth connecting portion 305 and the seventh connecting portion 307, and the sixth strip baffle 323 connected to both the sixth connecting portion 306 and the eighth connecting portion 308. Products can be placed on the storage countertop 3, where the storage countertop 3 is arranged above the rolling device 2 and moves with movement of the rolling device 2, thereby a position of the storage countertop 3 can be adjusted.

Figure 4:
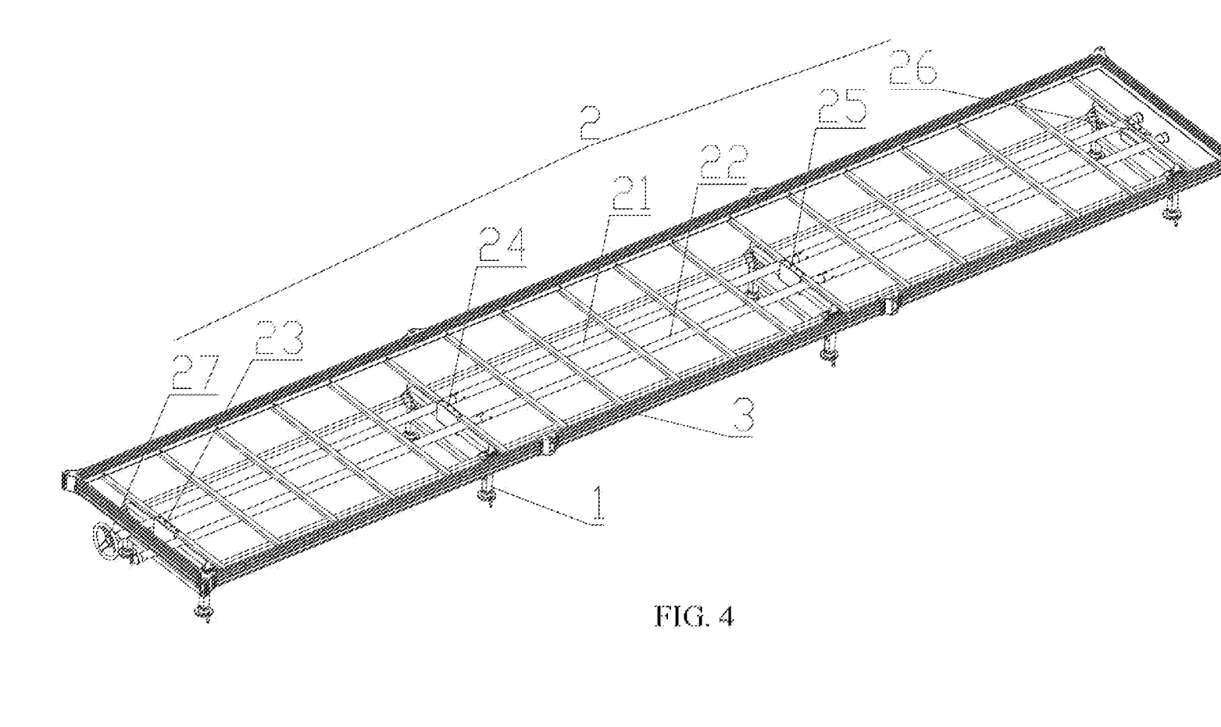
FIG. 4 is a schematic view of a rolling device arranged between the support device and the storage countertop of the mobile storage goods shelf of FIG. 1.

The rolling device 2 includes a first shaft lever 21, a second shaft lever 22, a first limiting plate 23, a second limiting plate 24, a third limiting plate 25 and a fourth limiting plate 26; the first shaft lever 21 and the second shaft lever 22 are each composed of a plurality of shaft levers and are detachable from each other; a handwheel 27 arranged on one end of the first shaft lever 21; positions of all the first limiting plate 23, the second limiting plate 24, the third limiting plate 25 and the fourth limiting plate 26 corresponding to each other, and the first shaft lever 21 and the second shaft lever 22 respectively arranged on both sides of each of the first limiting plate 23, the second limiting plate 24, the third limiting plate 25 and the fourth limiting plate 26; one end of the first limiting plate 23 buckled onto the first cross bar 117, and the other end of the first limiting plate 23 buckled onto the ninth cross bar 35; one end of the second limiting plate 24 buckled onto the third cross bar 119, and the other end of the second limiting plate 24 buckled onto the ninth cross bar 35; one end of the third limiting plate 25 buckled onto the fifth cross bar 125, and the other end of the third limiting plate 25 buckled onto the ninth cross bar 35; one end of the fourth limiting plate 26 buckled onto the seventh cross bar 135, and the other end of the fourth limiting plate buckled onto the ninth cross bar 35. The first shaft lever 21 is driven to move by rotating the handwheel 27, so that the storage countertop 3 is driven to follow moving, thereby the protective device 4 is also driven to move. A movement distance of each of the first shaft lever 21 and the second shaft lever 22 is limited by all of the first limiting plate 23, the second limiting plate 24, the third limiting plate 25 and the fourth limiting plate 26. In this way, both the first shaft lever 21 and the second shaft lever 22 can only perform reciprocating motion thereof.

Figure 5:
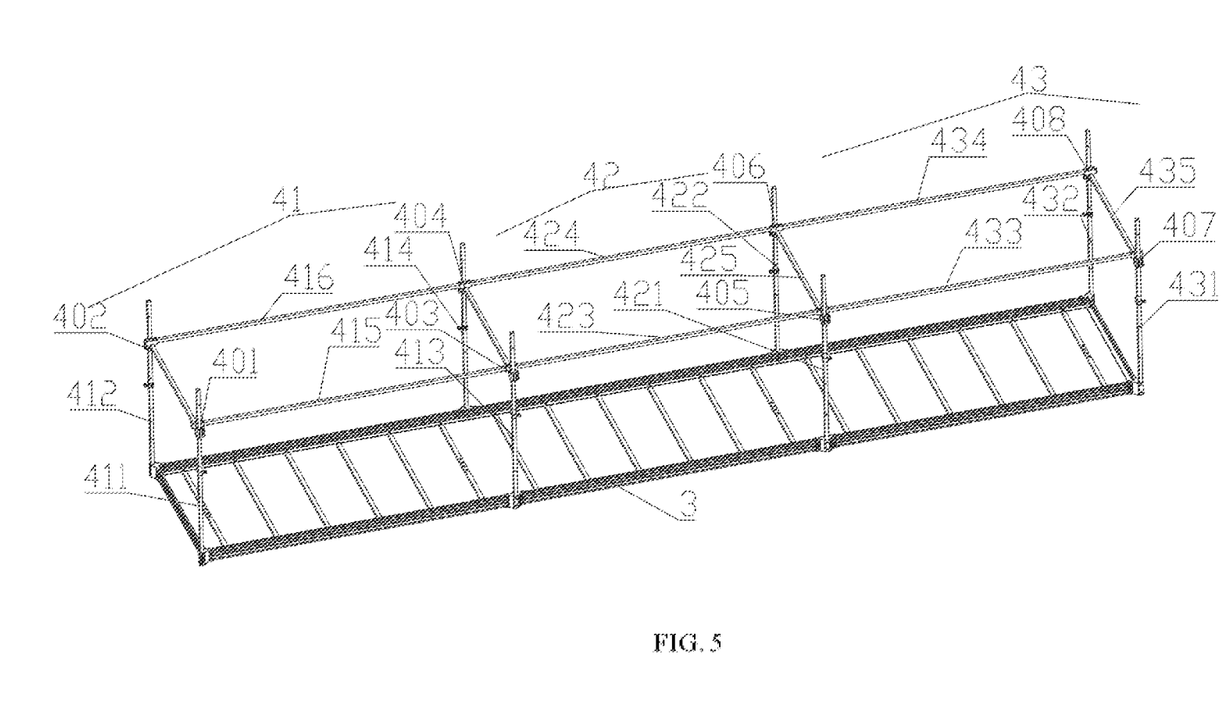
FIG. 5 is a schematic view of a protective device arranged on the storage countertop of the mobile storage goods shelf of FIG. 1.
Figure 8:
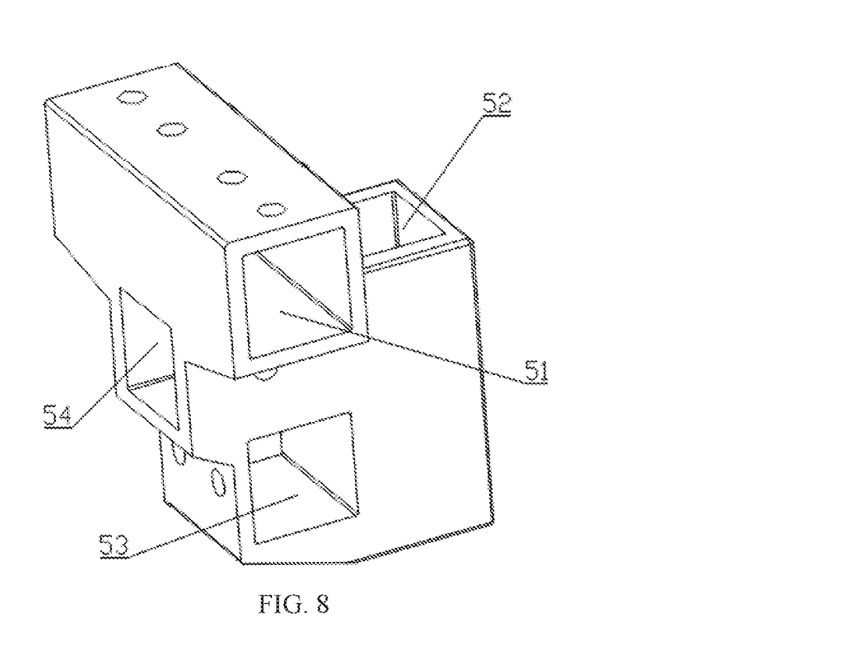
FIG. 8 is a schematic view of a connecting unit of the mobile storage goods shelf of FIG. 1.

The protective device 4 includes a first connecting unit 401, a second connecting unit 402, a third connecting unit 403, a fourth connecting unit 404, a fifth connecting unit 405, a sixth connecting unit 406, a seventh connecting unit 407 and an eighth connecting unit 408; each of the first connecting unit 401, the second connecting unit 402, the third connecting unit 403, the fourth connecting unit 404, the fifth connecting unit 405, the sixth connecting unit 406, the seventh connecting unit 407 and the eighth connecting unit 408 including a first through hole 51, a second through hole 52, a third through hole 53 and a sixth limiting hole 54 correspondingly; the first protecting module 41 including a first long tube 411, a second long tube 412, a third long tube 413, a fourth long tube 414, a first square tube 415, a second square tube 416, a first rectangular tube 417 and a second rectangular tube 418; one end of the first rectangular tube 417 arranged inside the sixth limiting hole 54 of the first connecting unit 401, and the other end of the first rectangular tube 417 arranged inside the sixth limiting hole 54 of the second connecting unit 402; one end of the second rectangular tube 418 arranged inside the sixth limiting hole 54 of the third connecting unit 403, and the other end of the second rectangular tube 418 arranged inside the sixth limiting hole 54 of the fourth connecting unit 404; one end of the first long tube 411 arranged inside the second through hole 52 of the first connecting unit 401, and the other end of the first long tube 411 passing through the second through hole 52 of the first connecting unit 401 and arranged inside the first connecting portion 301; one end of the second long tube 412 arranged inside the second through hole 52 of the second connecting unit 302, and the other end of the second long tube 412 passing through the second through hole 52 of the second connecting unit 402 and arranged inside the second connecting portion 302; one end of the third long tube 413 arranged inside the second through hole 52 of the third connecting unit 403, and the other end of the third long tube 413 passing through the second through hole 52 of the third connecting unit 403 and arranged inside the third connecting portion 303; one end of the fourth long tube 414 arranged inside the second through hole 52 of the fourth connecting unit 404, and the other end of the fourth long tube 414 passing through the second through hole 52 of the fourth connecting unit 404 and arranged inside the fourth connecting portion 304; one end of the first square tube 415 arranged in the first through hole 51 of the first connecting unit 401, and the other end of the first square tube 415 arranged in the first through hole 51 of the third connecting unit 403; one end of the second square tube 416 arranged in the first through hole 51 of the second connecting unit 402, and the other end of the second square tube 416 arranged in the first through hole 51 of the fourth connecting unit 404.

The second protecting module 42 includes a fifth long tube 421, a sixth long tube 422, a third square tube 423, a fourth square tube 424 and a third rectangular tube 425; one end of the fifth long tube 421 arranged inside the second through hole 52 of the fifth connecting unit 405, and the other end of the fifth long tube 421 passing through the second through hole 52 of the fifth connecting unit 405 and arranged inside the fifth connecting portion 305; one end of the sixth long tube 422 arranged inside the second through hole 52 of the sixth connecting unit 406, and the other end of the sixth long tube 422 passing through the second through hole 52 of the sixth connecting unit 406 and arranged inside the sixth connecting portion 306; one end of the third square tube 423 arranged inside the first through hole 51 of the third connecting unit 403, and the other end of the third square tube 423 arranged inside the first through hole 51 of the fifth connecting unit 405; one end of the fourth square tube 424 arranged inside the first through hole 51 of the fourth connecting unit 404, and the other end of the fourth square tube 424 arranged inside the first through hole 51 of the sixth connecting unit 406; one end of the third rectangular tube 425 arranged inside the sixth limiting hole 54 of the fifth connecting unit 405, and the other end of the third rectangular tube 425 arranged inside the sixth limiting hole 54 of the sixth connecting unit 406.

The third protecting module 43 includes a seventh long tube 431, an eighth long tube 432, a fifth square tube 433, a sixth square tube 434 and a fourth rectangular tube 435; one end of the seventh long tube 431 arranged inside the second through hole 52 of the seventh connecting unit 407, and the other end of the seventh long tube 431 passing through the second through hole 52 of the seventh connecting unit 407 and arranged inside the seventh connecting portion 307; one end of the eighth long tube 432 arranged inside the second through hole 52 of the eighth connecting unit 408, and the other end of the eighth long tube 432 passing through the second through hole 52 of the eighth connecting unit 408 and arranged inside the eighth connecting portion 308; one end of the fifth square tube 433 arranged inside the first through hole 51 of the fifth connecting unit 405, and the other end of the fifth square tube 433 arranged inside the first through hole 51 of the seventh connecting unit 407; one end of the sixth square tube 434 arranged inside the first through hole 51 of the sixth connecting unit 406, and the other end of the sixth square tube 434 arranged inside the first through hole 51 of the eighth connecting unit 408; one end of the fourth rectangular tube 435 arranged inside the sixth limiting hole 54 of the seventh connecting unit 407, and the other end of the fourth rectangular tube 435 arranged inside the sixth limiting hole 54 of the eighth connecting unit 408. All of the first protecting module 41, the second protecting module 42, and the third protecting module 43 cooperatively form a protective ring to surround the storage countertop 3, so as to protect the items that are placed on the storage countertop 3.

Although the features and elements of the present disclosure are described as embodiments in particular combinations, each feature or element can be used alone or in other various combinations within the principles of the present disclosure to the full extent indicated by the broad general meaning of the terms in which the appended claims are expressed.

What is claimed is:

1. A mobile storage goods shelf configured to be used in a field of logistics and warehousing, the mobile storage goods shelf comprising:
a support device, a rolling device arranged on the support device, a storage countertop arranged on the rolling device, and a protective device arranged on the storage countertop;
the support device comprising a first supporting module, a second supporting module and a third supporting module, one end of the second supporting module connected to the first supporting module, and another end of the second supporting module connected to the third supporting module;
the protective device comprising a first protecting module, a second protecting module and a third protecting module, one end of the second protecting module connected to the first protecting module, and another end of the second protecting module connected to the third protecting module; and wherein all of the support device, the rolling device, the storage countertop and the protective device can extend or add modules along a horizontal direction; and wherein
the support device comprises a first connecting member, a second connecting member, a third connecting member, a fourth connecting member, a fifth connecting member, a sixth connecting member, a seventh connecting member and an eighth connecting member; each of the first connecting member, the second connecting member, the third connecting member, the fourth connecting member, the fifth connecting member, the sixth connecting member, the seventh connecting member and the eighth connecting member comprising a first limiting hole, a second limiting hole, a third limiting hole, a fourth limiting hole and a fifth limiting hole with a same positions thereof.

2. The mobile storage goods shelf as claimed in claim 1, wherein the first supporting module comprises a first supporting rod, a second supporting rod, a third supporting rod, a fourth supporting rod, a first bar, a second bar, a first cross bar, a second cross bar, a third cross bar and a fourth cross bar; an upper end of the first supporting rod received in the fourth limiting hole of the first connecting member, an upper end of the second supporting rod received in the fourth limiting hole of the second connecting member, an upper end of the third supporting rod received in the fourth limiting hole of the third connecting member, and an upper end of the fourth supporting rod received in the fourth limiting hole of the fourth connecting member; one end of the first bar received in the second limiting hole of the first connecting member, and another end of the first bar received in the third limiting hole of the third connecting member; one end of the second bar received in the third limiting hole of the second connecting member, and another end of the second bar received in the second limiting hole of the fourth connecting member; one end of the first cross bar received in the first limiting hole of the first connecting member and connected to the first limiting hole of the first connecting member, and another end of the first cross bar received in the first limiting hole of the second connecting member and connected to the first limiting hole of the second connecting member; one end of the third cross bar received in the first limiting hole of the third connecting member and connected to the first limiting hole of the third connecting member, and another end of the third cross bar received in the first limiting hole of the fourth connecting member and connected to the first limiting hole of the fourth connecting member; one end of the second cross bar connected to the first supporting rod, and another end of the second cross bar connected to the second supporting rod; one end of the fourth cross bar connected to the third supporting rod, and another end of the fourth cross bar connected to the fourth supporting rod.

3. The mobile storage goods shelf as claimed in claim 2, wherein the second supporting module comprises a fifth supporting rod, a sixth supporting rod, a third bar, a fourth bar, a fifth cross bar and a sixth cross bar; an upper end of the fifth supporting rod received in the fourth limiting hole of the fifth connecting member, and an upper end of the sixth supporting rod received in the fourth limiting hole of the sixth connecting member; one end of the third bar received the second limiting hole of the third connecting member, and another end of the third bar received the third limiting hole of the fifth connecting member; one end of the fourth bar received the third limiting hole of the fourth connecting member, and another end of the fourth bar received the second limiting hole of the sixth connecting member; one end of the fifth cross bar received in the first limiting hole of the fifth connecting member and connected to the first limiting hole of the fifth connecting member, and another end of the fifth cross bar received in the first limiting hole of the sixth connecting member and connected to the first limiting hole of the sixth connecting member; one end of the sixth cross bar connected to the fifth supporting rod, and another end of the sixth cross bar connected to the sixth supporting rod.

4. The mobile storage goods shelf as claimed in claim 3, wherein the third supporting module comprises a seventh supporting rod, an eighth supporting rod, a fifth bar, a sixth bar, a seventh cross bar and an eighth cross bar; an upper end of the seventh supporting rod received in the fourth limiting hole of the seventh connecting member, and an upper end of the eighth supporting rod received in the fourth limiting hole of the eighth connecting member; one end of the fifth bar received in the second limiting hole of the fifth connecting member, and another end of the fifth bar received in the third limiting hole of the seventh connecting member; one end of the sixth bar received in the third limiting hole of the sixth connecting member, and another end of the sixth bar received in the second limiting hole of the eighth connecting member; one end of the seventh cross bar received in the first limiting hole of the seventh connecting member and connected to the first limiting hole of the seventh connecting member, and another end of the seventh cross bar received in the first limiting hole of the eighth connecting member and connected to the first limiting hole of the eighth connecting member; one end of the eighth cross bar connected to the seventh supporting rod, and another end of the eighth cross bar connected to the eighth supporting rod.

5. The mobile storage goods shelf as claimed in claim 1, wherein the storage countertop comprises a first strip module, a second strip module, a first transverse plate, a second transverse plate, and a plurality of ninth cross bars, a first connecting portion, a second connecting portion, a third connecting portion, a fourth connecting portion, a fifth connecting portion, a sixth connecting portion, a seventh connecting portion and an eighth connecting portion; the plurality of ninth cross bars arranged in sequence between the first strip module and the second strip module, and respectively connected to the first strip module and the second strip module; the first strip module comprising a first strip baffle, a third strip baffle, and a fifth strip baffle; the second strip module comprising a second strip baffle, a fourth strip baffle, and a sixth strip baffle; the first transverse plate connected to both the first connecting portion and the second connecting portion, and the second transverse plate connected to both the seventh connecting portion and the eighth connecting portion; the first strip baffle connected to both the first connecting portion and the third connecting portion, and the second strip baffle connected to both the second connecting portion and the fourth connecting portion; the third strip baffle connected to both the third connecting portion and the fifth connecting portion, and the fourth strip baffle connected to both the fourth connecting portion and the sixth connecting portion; the fifth strip baffle connected to both the fifth connecting portion and the seventh connecting portion, and the sixth strip baffle connected to both the sixth connecting portion and the eighth connecting portion.

6. The mobile storage goods shelf as claimed in claim 4, wherein the rolling device comprises a first shaft lever, a second shaft lever, a first limiting plate, a second limiting plate, a third limiting plate and a fourth limiting plate; the first shaft lever and the second shaft lever are each composed of a plurality of shaft levers and are detachable from each other; a handwheel arranged on one end of the first shaft lever; positions of all the first limiting plate, the second limiting plate, the third limiting plate and the fourth limiting plate corresponding to each other, and the first shaft lever and the second shaft lever respectively arranged on both sides of each of the first limiting plate, the second limiting plate, the third limiting plate and the fourth limiting plate; one end of the first limiting plate buckled onto the first cross bar, and another end of the first limiting plate buckled onto the ninth cross bar; one end of the second limiting plate buckled onto the third cross bar, and another end of the second limiting plate buckled onto the ninth cross bar; one end of the third limiting plate buckled onto the fifth cross bar, and another end of the third limiting plate buckled onto the ninth cross bar; one end of the fourth limiting plate buckled onto the seventh cross bar, and another end of the fourth limiting plate buckled onto the ninth cross bar.

7. The mobile storage goods shelf as claimed in claim 5, wherein the protective device comprises a first connecting unit, a second connecting unit, a third connecting unit, a fourth connecting unit, a fifth connecting unit, a sixth connecting unit, a seventh connecting unit and an eighth connecting unit; each of the first connecting unit, the second connecting unit, the third connecting unit, the fourth connecting unit, the fifth connecting unit, the sixth connecting unit, the seventh connecting unit and the eighth connecting unit comprising a first through hole, a second through hole, a third through hole and a sixth limiting hole correspondingly; the first protecting module comprising a first long tube, a second long tube, a third long tube, a fourth long tube, a first square tube, a second square tube, a first rectangular tube and a second rectangular tube; one end of the first rectangular tube arranged inside the sixth limiting hole of the first connecting unit, and another end of the first rectangular tube arranged inside the sixth limiting hole of the second connecting unit; one end of the second rectangular tube arranged inside the sixth limiting hole of the third connecting unit, and another end of the second rectangular tube arranged inside the sixth limiting hole of the fourth connecting unit; one end of the first long tube arranged inside the second through hole of the first connecting unit, and another end of the first long tube configured to pass through the second through hole of the first connecting unit and arranged inside the first connecting portion; one end of the second long tube arranged inside the second through hole of the second connecting unit, and another end of the second long tube configured to pass through the second through hole of the second connecting unit and arranged inside the second connecting portion; one end of the third long tube arranged inside the second through hole of the third connecting unit, and another end of the third long tube passing configured to pass through the second through hole of the third connecting unit and arranged inside the third connecting portion; one end of the fourth long tube arranged inside the second through hole of the fourth connecting unit, and another end of the fourth long tube configured to pass through the second through hole of the fourth connecting unit and arranged inside the fourth connecting portion; one end of the first square tube arranged in the first through hole of the first connecting unit, and another end of the first square tube arranged in the first through hole of the third connecting unit; one end of the second square tube arranged in the first through hole of the second connecting unit, and another end of the second square tube arranged in the first through hole of the fourth connecting unit.

8. The mobile storage goods shelf as claimed in claim 7, wherein the second protecting module comprises a fifth long tube, a sixth long tube, a third square tube, a fourth square tube and a third rectangular tube; one end of the fifth long tube arranged inside the second through hole of the fifth connecting unit, and another end of the fifth long tube configured to pass through the second through hole of the fifth connecting unit and arranged inside the fifth connecting portion; one end of the sixth long tube arranged inside the second through hole of the sixth connecting unit, and another end of the sixth long tube configured to pass through the second through hole of the sixth connecting unit and arranged inside the sixth connecting portion; one end of the third square tube arranged inside the first through hole of the third connecting unit, and another end of the third square tube arranged inside the first through hole of the fifth connecting unit; one end of the fourth square tube arranged inside the first through hole of the fourth connecting unit, and another end of the fourth square tube arranged inside the first through hole of the sixth connecting unit; one end of the third rectangular tube arranged inside the sixth limiting hole of the fifth connecting unit, and another end of the third rectangular tube arranged inside the sixth limiting hole of the sixth connecting unit.

9. The mobile storage goods shelf as claimed in claim 8, wherein the third protecting module comprises a seventh long tube, an eighth long tube, a fifth square tube, a sixth square tube and a fourth rectangular tube; one end of the seventh long tube arranged inside the second through hole of the seventh connecting unit, and another end of the seventh long tube configured to pass through the second through hole of the seventh connecting unit and arranged inside the seventh connecting portion; one end of the eighth long tube arranged inside the second through hole of the eighth connecting unit, and another end of the eighth long tube configured to pass through the second through hole of the eighth connecting unit and arranged inside the eighth connecting portion; one end of the fifth square tube arranged inside the first through hole of the fifth connecting unit, and another end of the fifth square tube arranged inside the first through hole of the seventh connecting unit; one end of the sixth square tube arranged inside the first through hole of the sixth connecting unit, and another end of the sixth square tube arranged inside the first through hole of the eighth connecting unit; one end of the fourth rectangular tube arranged inside the sixth limiting hole of the seventh connecting unit, and another end of the fourth rectangular tube arranged inside the sixth limiting hole of the eighth connecting unit.

* * * * *